(12) United States Patent
Uemura et al.

(10) Patent No.: US 9,098,321 B2
(45) Date of Patent: Aug. 4, 2015

(54) METHOD AND COMPUTER FOR CONTROLLING VIRTUAL MACHINE

(75) Inventors: Tetsuya Uemura, Sayama (JP); Naoya Hattori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 13/585,403

(22) Filed: Aug. 14, 2012

(65) Prior Publication Data

US 2013/0086583 A1    Apr. 4, 2013

(30) Foreign Application Priority Data

Sep. 29, 2011  (JP) .................................. 2011-215542

(51) Int. Cl.
  *G06F 9/455*  (2006.01)
  *G06F 9/44*   (2006.01)
(52) U.S. Cl.
  CPC .......... *G06F 9/45533* (2013.01); *G06F 9/4401* (2013.01)
(58) Field of Classification Search
  USPC ............................................................ 718/1
  See application file for complete search history.

(56) References Cited

U.S. PATENT DOCUMENTS

| 7,840,790 | B1 | 11/2010 | Sekhar et al. | |
|---|---|---|---|---|
| 2006/0218388 | A1 | 9/2006 | Zur et al. | |
| 2007/0283169 | A1* | 12/2007 | Locker et al. | 713/193 |
| 2009/0119087 | A1 | 5/2009 | Ang et al. | |
| 2009/0133016 | A1 | 5/2009 | Brown et al. | |
| 2009/0217265 | A1* | 8/2009 | Ishikawa | 718/1 |
| 2009/0276774 | A1* | 11/2009 | Kinoshita | 718/1 |
| 2010/0275205 | A1* | 10/2010 | Nakajima | 718/1 |
| 2011/0179414 | A1* | 7/2011 | Goggin et al. | 718/1 |

FOREIGN PATENT DOCUMENTS

| JP | 2009-176213 A | 8/2009 |
|---|---|---|
| JP | 2009-230433 A | 10/2009 |
| WO | WO 2011/078861 A1 | 6/2011 |

OTHER PUBLICATIONS

SR-IOV by PCI-SIG, Single Root I/O Virtualization and Sharing Specification Revision 1.1, Sep. 8, 2009, pp. 1-90 (ninety (90)sheets).
"Single Root I/O Virtualization and Sharing Specification Revision 1.0", Sep. 11, 2007 (eight-three (83) pages).
European Search Report dated Feb. 11, 2013 (nine (9) pages).

(Continued)

*Primary Examiner* — Emerson Puente
*Assistant Examiner* — Steven Do
(74) *Attorney, Agent, or Firm* — Crowell & Moring LLP

(57) ABSTRACT

A virtual machine booting method for booting a virtual machine, the virtual machine comprising: a physical computer which includes a processor, a memory, and storage; and a virtualization module which assigns computer resources of the physical computer to the virtual machine, the method comprising: setting, by the virtualization module, before the virtual machine is booted, states of a first access path and a second access path which couple the virtual machine and the storage; booting the virtual machine by the virtualization module; determining, by the virtualization module, when to switch between the first access path and the second access path; and switching the first access path to the second access path when the virtualization module determines that it is time to switch between the first access path and the second access path.

12 Claims, 10 Drawing Sheets

(56) References Cited

OTHER PUBLICATIONS

Komiya, "New Network Standards Quietly Supporting Continuous Price Reduction of Virtualized Environment," Nikkei Computer, Nikkei Business Publication, Inc., Mar. 31, 2010, No. 753, pp. 150-153 (with English translation).

Japanese Office Action dated Aug. 12, 2014 (three (3) pages).

* cited by examiner

Fig.3A

| VNIC# | VIRTUAL MACHINE NUMBER |
|---|---|
| VNIC0 | #0 |
| VNIC1 | #1 |
| ⋮ | ⋮ |

Fig.3B

| PF# | VIRTUAL MACHINE NUMBER |
|---|---|
| PF-1 | #0 |
| PF-2 | #0 |
| ⋮ | ⋮ |

Fig.3C

| PF# | VF# | VIRTUAL MACHINE NUMBER |
|---|---|---|
| PF-1 | VF-1-1 | #1 |
| PF-1 | VF-1-2 | NO ASSIGNMENT |
| ⋮ | ⋮ | ⋮ |

Fig.4

| VIRTUAL MACHINE NUMBER | LUN | WWN | iSCSI NAME |
|---|---|---|---|
| #0 | 0 | 00:...:01 | NO ASSIGNMENT |
| #0 | 1 | 00:...:02 | iqn.2011-06... |
| #1 | 0 | 00:...:02 | iqn.2011-06... |
| ⋮ | ⋮ | ⋮ | ⋮ |

Fig. 5A

| VIRTUAL MACHINE NUMBER | LUN | PF | VF | iSCSI | |
|---|---|---|---|---|---|
| #0 | 0 | 1 | 0 | 0 | 511 |
| #0 | 1 | 1 | 0 | 0 | 512 |
| #1 | 0 | 0 | 0 | 1 | |

Fig. 5B

| VIRTUAL MACHINE NUMBER | LUN | PF | VF | iSCSI | |
|---|---|---|---|---|---|
| #0 | 0 | 1 | 0 | 0 | 511' |
| #0 | 1 | 0 | 0 | 0 | 512' |
| #1 | 0 | 0 | 1 | 0 | |

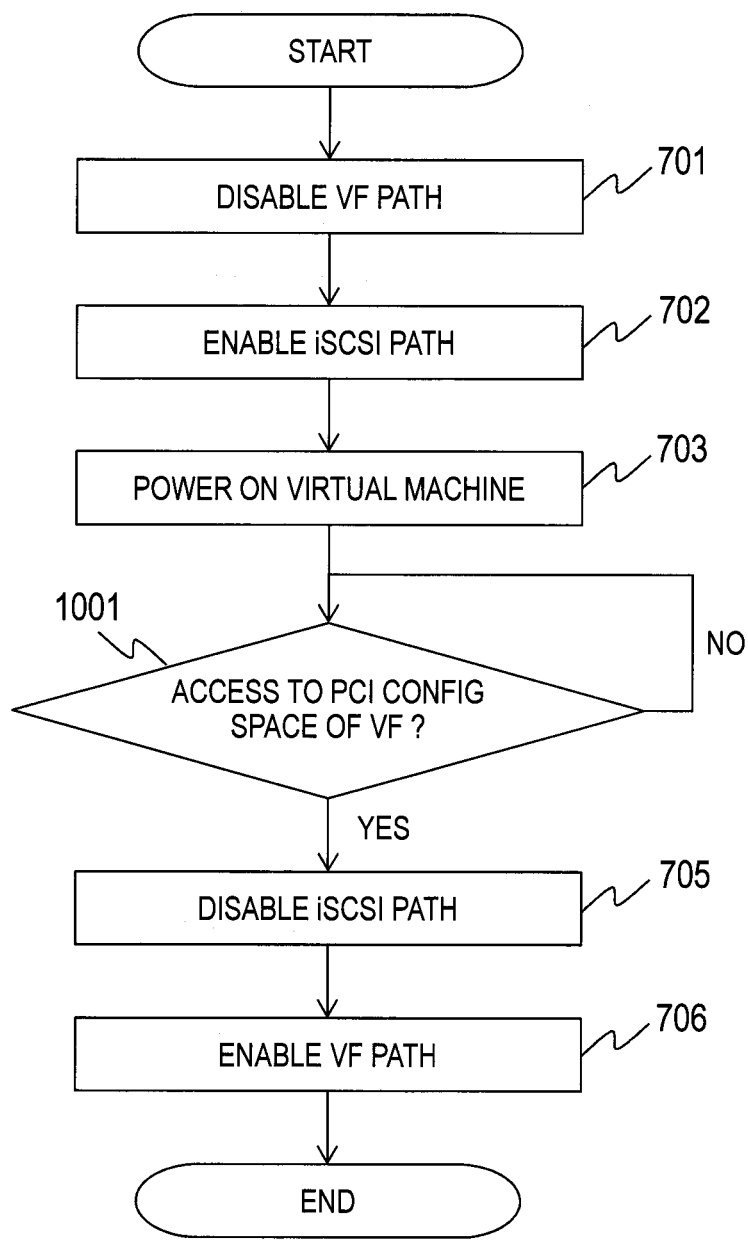

METHOD AND COMPUTER FOR CONTROLLING VIRTUAL MACHINE

CLAIM OF PRIORITY

The present application claims priority from Japanese patent application JP 2011-215542 filed on Sep. 29, 2011, the content of which is hereby incorporated by reference into this application.

BACKGROUND OF THE INVENTION

This invention relates to a virtual machine, and more particularly, to a method of booting a virtual machine that uses a plurality of access means to boot the same boot device.

In recent semiconductor manufacture, the advance in process rules have shifted the method of improving CPU performance from improving operating frequency to increasing the number of CPU cores mounted on a single LSI chip. Packaging that packs a plurality of or many CPU cores in a physical computer has thus become common. Server virtualization technology is one way to make full use of a plurality of or many CPU cores mounted on a physical computer. Server virtualization software (a hypervisor) generates a plurality of virtual machines on a single physical computer. With a plurality of virtual machines running on one physical computer, the physical computer is improved in CPU utilization ratio.

A hypervisor partitions a main memory mounted on a physical computer into a plurality of partitions to assign each partition as the main memory of one of virtual machines, and also assigns CPU cores mounted on the physical computer to the respective virtual machines in a dedicated manner or in a time-sharing manner. This is free of swap-out, unlike virtual storage, and the access performance level of a virtual machine accessing the main memory is therefore equivalent to that of a physical computer. The processing overhead of a hypervisor is small, which makes a virtual machine's performance close to a physical computer's performance with regard to CPU and main memory.

There is a great gap in IO adapter performance between a virtual machine and a physical computer. Because of restrictions in packaging space, only a limited number of IO adapters can be mounted on a physical computer. A single IO adapter is accordingly shared among a plurality of virtual machines. The hypervisor allows virtual machines to share an IO adapter by providing the virtual machines with virtual IO adapters, which emulate an IO adapter. A problem is that the IO performance of a virtual machine is impaired compared to the IO performance of a physical computer by overhead by the emulation.

To solve this problem, the PCI-SIG has set forth a standard called Single Root I/O Virtualization (SR-IOV). SR-IOV is a system of providing the main part of IO adapter sharing in hardware. In SR-IOV, the hypervisor handles only infrequent processing such as hardware initialization, which gives a virtual machine high IO performance. As a technology that uses IOV, the basic processing operation of a hypervisor is disclosed in US 2009/0133016. Known specifications of SR-IOV by PCI-SIG, "Single Root I/O Virtualization and Sharing Specification Revision 1.1", 2009.

In SR-IOV, an IO adapter and a virtual IO adapter are called a physical function (PF) and a virtual function (VF), respectively. In order to reduce the LSI packaging area, VFs are packaged differently from the packaging method of PFs. Firstly, a VF is not available for use until the VF Enable bit in the SR-IOV Control field of a PF's SR-IOV Extended Capabilities is set. Secondly, the number of registers available for use differs between a PF and a VF and, even with the same register, the behavior regarding read and write may vary between a PF and a VF in some cases. Because of these differences, using a PF and a VF together requires a device driver dedicated to the PF and a device driver dedicated to the VF. After the PF device driver initializes the IO adapter, the VF Enable bit is set to enable the VF. The PF device driver also handles the overall hardware settings and error monitoring of the IO adapter. The VF device driver handles only the settings and operation of the VF part.

US 2009/0119087 discloses a virtual device that has an emulation mode and a pass through mode. The emulation mode and the pass through mode are switched depending on the operation type. In an example given by US 2009/0119087, the emulation mode is used for an infrequent operation that does not require so high a performance level, and is switched to the pass through mode for a frequent operation that requires a high performance level.

SUMMARY OF THE INVENTION

An OS is booted by the following two-stage process:

In the first stage of the process, a boot service device driver of a Unified Extensible Firmware Interface (UEFI), or a driver in a ROM Basic Input/Output System (BIOS) of the IO adapter, first reads a boot image out of a boot device. In the second stage of the process, an OS device driver built in the kernel in the boot image reads a necessary file out of the boot device. In other words, booting an OS requires a UEFI device driver or a ROM BIOS driver in addition to an OS device driver.

In the case of an IO adapter of SR-IOV such as a host bus adapter (HBA), an OS PF device driver (PF driver) and an OS VF device driver (VF driver) are necessary for each OS supported. Using a PF as a boot device requires a UEFI PF driver. Using a VF as a boot device further requires a UEFI VF driver. To use the VF, the VF first needs to be set by accessing the PF of the IO adapter, and the IO adapter of SR-IOV cannot be used with VF drivers alone. The resultant problem is that SR-IOV increases up the driver development cost for IO adapter venders.

In the case where a BIOS is used instead of a UEFI, too, a ROM BIOS driver is necessary in place of a UEFI device driver, and the problem of increased driver development cost of IO adapter venders remains.

When other means are used to boot instead of using a VF as a boot device, storage accessed by the VF is given a drive letter ("D", "E", or others) different from that of the boot device (usually "C"). This is because server virtualization calls for a different mode of operation from that of a physical computer, thereby increasing the man-hour for system construction and operation and management. Specifically, the discrepancy between a drive letter set to a virtualized image and an actually assigned drive letter creates path inconsistency, and correcting this inconsistency takes work. These result in a problem of increase in operation and management cost.

Using the virtual device that switches between the emulation mode and the pass through mode requires a device driver that is compatible with both of the emulation mode and the pass through mode. The need to develop as many device drivers as the number of combinations of a hypervisor type and a supported OS leaves the problem of increased driver development cost unsolved for IO adapter vendors.

This invention has been made in view of the problems described above, and it is therefore an object of this invention to boot a virtual machine without needing to develop a UEFI VF driver while preventing a change in drive letter.

A representative aspect of this invention is as follows. A virtual machine booting method for booting a virtual machine, the virtual machine comprising: a physical computer which includes a processor, a memory, and storage; and a virtualization module which assigns computer resources of the physical computer to the virtual machine, the method comprising: a first step of setting, by the virtualization module, before the virtual machine is booted, states of a first access path and a second access path which couple the virtual machine and the storage; a second step of booting the virtual machine by the virtualization module; a third step of determining, by the virtualization module, when to switch between the first access path and the second access path; and a fourth step of switching the first access path to the second access path when the virtualization module determines that it is time to switch between the first access path and the second access path.

This invention thus provides a first access pass for a virtual machine immediately after booted to access storage, thereby eliminating the need to develop a UEFI (or ROM BIOS) VF driver and preventing the drive letter from changing. This invention therefore has an effect of keeping the driver development cost of IO adapter vendors from increasing and keeping the operation and management cost from increasing.

BRIEF DESCRIPTION OF THE DRAWINGS

FIG. 3A illustrates a virtual NIC assignment table, which is provided by the virtual NIC emulator according to the first embodiment of this invention.

FIG. 3B illustrates an assignment table of the PFs of the HBA according to the first embodiment of this invention.

FIG. 3C illustrates an assignment table of the VFs of the HBA according to the first embodiment of this invention.

FIG. 4 illustrates the storage assignment table according to the first embodiment of this invention.

FIG. 5A illustrates the access path management table according to the first embodiment of this invention.

FIG. 5B illustrates the access path management table according to the first embodiment of this invention.

FIG. 10 is a flow chart of access path switching that is executed at the time of booting according to the second embodiment of this invention.

DETAILED DESCRIPTION OF THE PREFERRED EMBODIMENTS

Hereinafter, embodiments of the present invention are described with reference to the drawings. Same symbols indicate the same components.

First Embodiment

This embodiment describes an example of a configuration and processing for the case where a Unified Extensible Firmware Interface (UEFI) is used to boot a virtual machine. This embodiment has a feature that, in a virtual machine booted with the use of a UEFI, two access paths are provided for one boot device to switch from one of the access paths to the other during the booting.

Figure 1:
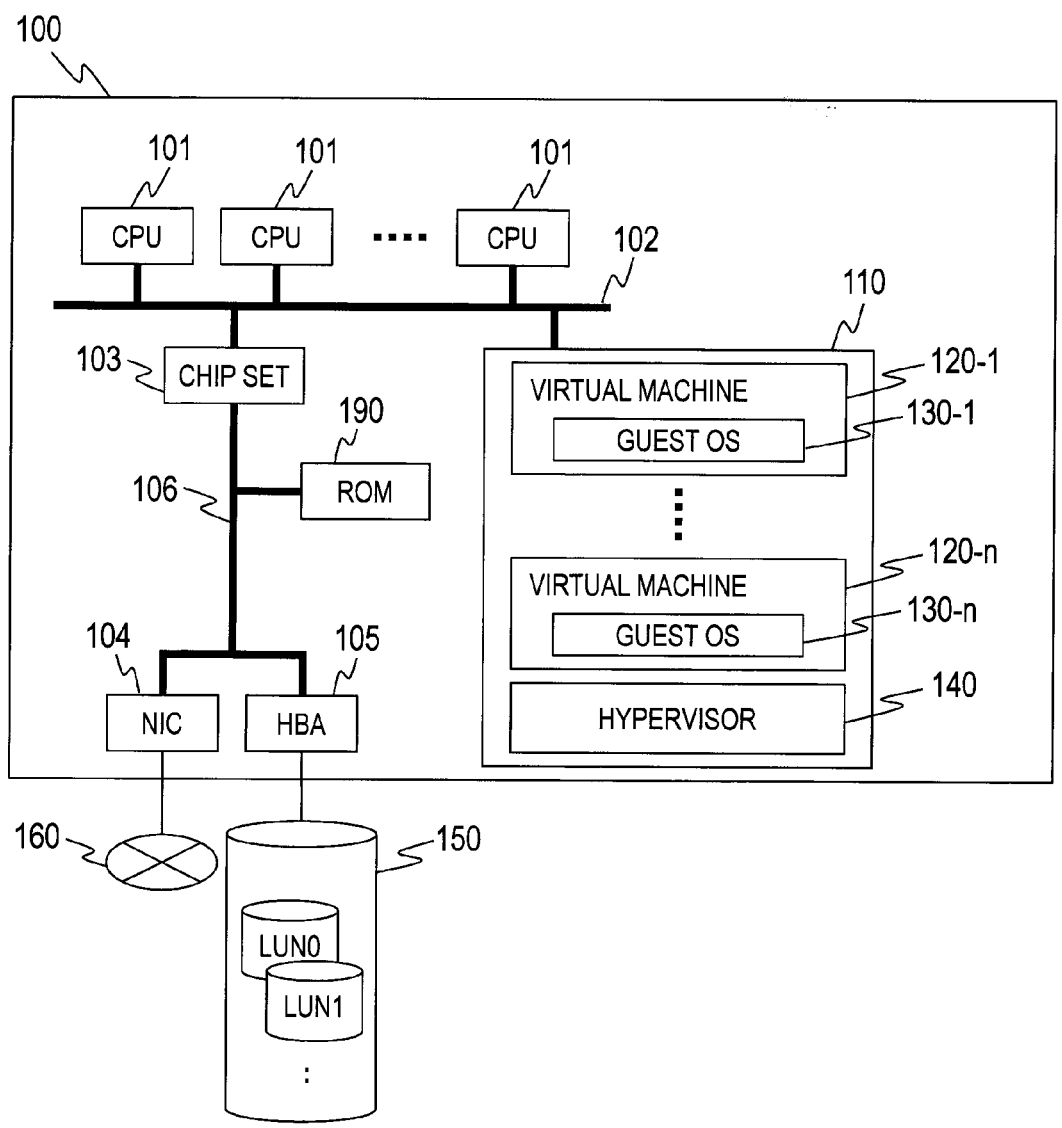
FIG. 1 is a block diagram of a physical computer according to a first embodiment of this invention.

FIG. 1 is a block diagram of a physical computer to which this invention is applied. In FIG. 1, reference symbol 100 denotes the physical computer; 101, a CPU; 102, an interconnect; 103, a chip set; 104, a network interface card (NIC); 105, a host bus adapter (HBA); 106, a bus (for example, a PCI bus); 110, a main memory; 120-1 to 120-n, virtual machines (or logical partitions); 130-1 to 130-n, guest operating systems (OSs); 140, a hypervisor; 150, storage; 160, a network; and 190, a ROM storing a UEFI. The UEFI may be stored in an EEPROM or a flash memory instead of the ROM 190. The virtual machines 120-1 to 120-n are collectively denoted by a symbol 120, and the guest OSs 130-1 to 130-n are collectively denoted by a symbol 130.

The chip set 103 and the main memory 110 are coupled to the CPU 101 via the interconnect 102. The NIC 104 and the HBA 105 are coupled to the chip set 103 via the bus 106. The NIC 104 is coupled to a network 160, and the storage 150 is coupled to the HBA 105. The storage 150 includes a plurality of logical units (or volumes).

The hypervisor 140 is loaded onto the main memory 110, and the plurality of virtual machines 120 controlled by the hypervisor 140 respectively execute the guest OSs 130. The configuration of the virtual machines 120 generated by the hypervisor 140, the type of the guest OSs 130 to be booted, and when to boot the guest OSs 130 are set via an input/output device (omitted from the drawings) of the physical computer 100, or via a management computer (omitted from the drawings) coupled to the network 160.

Figure 2:
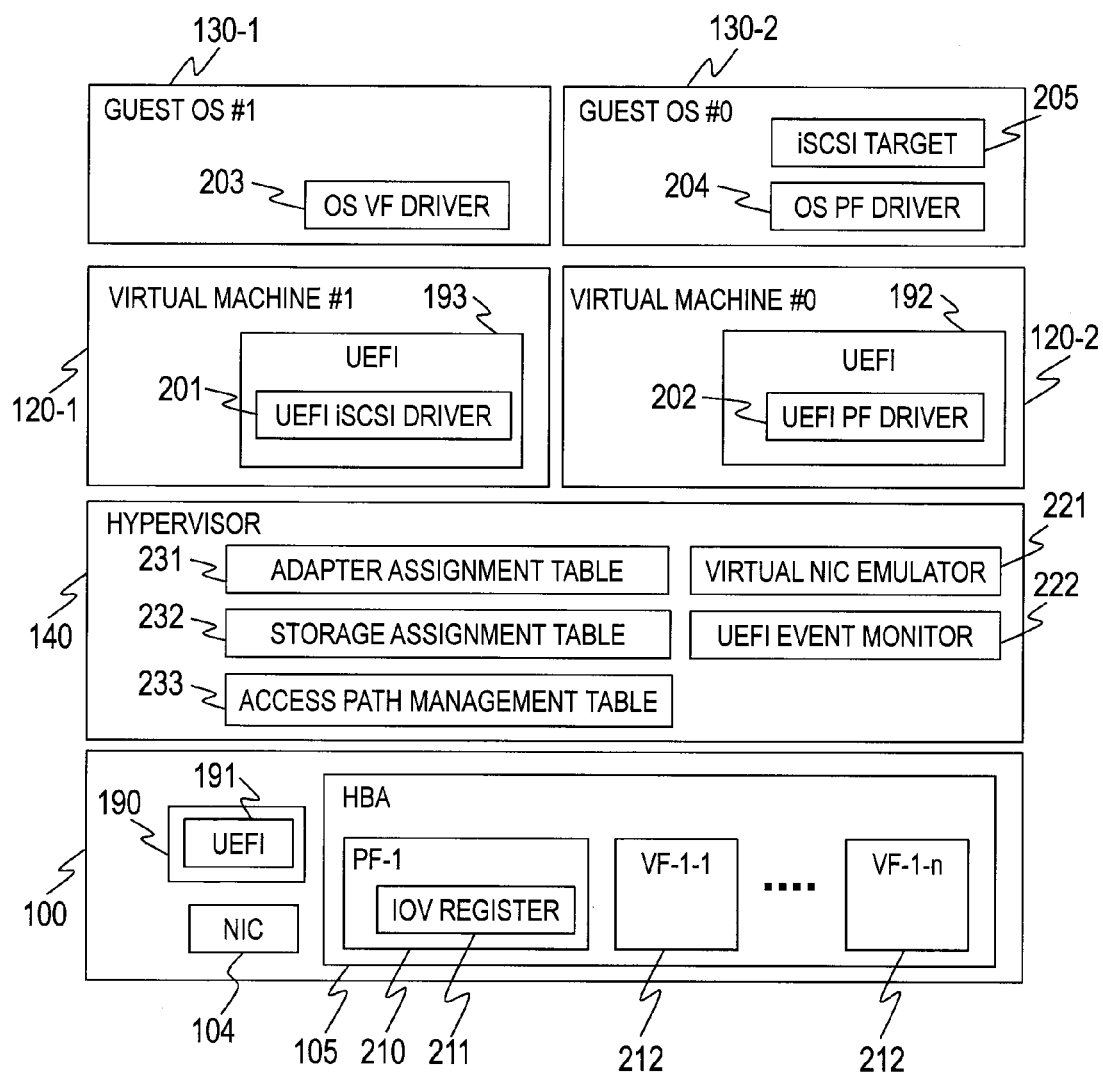
FIG. 2 is a block diagram illustrating an example of the physical computer and software stack according to the first embodiment of this invention.

FIG. 2 is a block diagram illustrating an example of the physical computer and software stack according to the first embodiment of this invention.

FIG. 2 illustrates an example in which the hypervisor 140 partitions computer resources of the physical computer 100 to generate the virtual machines 120-1 and 120-2. In the example of FIG. 2, the HBA 105 is used as an IO adapter shared by the plurality of virtual machines 120. The HBA 105 can provide a physical function (PF) and a virtual function (VF) in conformity to SR-IOV described above in the related art example.

In FIG. 2, reference numeral 120-1 denotes a virtual machine to be booted; 120-2, a virtual machine that provides an iSCSI target function; 130-1, a guest OS to be booted; 130-2, a guest OS that provides the iSCSI target function; 201, a UEFI iSCSI driver; 202, a UEFI PF driver; 203, an OS VF driver; 204, an OS PF driver; 205, an iSCSI target server; 210, PFs; 211, an IOV register; 212, VFs; 221, a virtual NIC emulator; 222, a UEFI event monitor; 231, an adapter assignment table; 232 a storage assignment table; and 233, an access path management table.

The physical computer 100 stores a UEFI 191 in the ROM 190. The HBA 105 which is in conformity to SR-IOV can provide the PFs (PF-1 in FIG. 2) 210, which provide a function at the time of boot or other times, and the plurality of VFs (VF-1-1 to VF-1-n in FIG. 2) 212. The PFs 210 of the HBA 105 each have the IOV register 211 for controlling the VFs. An arbitrary VF out of VF-1-1 to VF-1-n is enabled by the relevant virtual machine 120 or the hypervisor 140 by setting a given value to the VF Enable bit of the IOV register 211.

The hypervisor 140 boots by reading the UEFI 191 of the ROM 190. The hypervisor 140 first generates the virtual machine 120-2 and boots the guest OS 130-2. The hypervisor 140 provides a virtual UEFI 192 to the virtual machine 120-2. The hypervisor 140 provides the UEFI PF driver 202 to the virtual UEFI 192. The virtual UEFI 192 uses the UEFI PF driver 202 to access the PFs 210 of the HBA 105 and reads a boot image out of the storage 150. From the boot image, the guest OS 130-2 is booted.

The guest OS 130-2 has the OS PF driver 204 built in to use the PFs 210 of the HBA 105. The iSCSI target server 205 is executed on the guest OS 130-2. The iSCSI target server 205 is a server function that receives access from other virtual machines 120 and accesses the storage 150 via the PFs 210 of the HAB 105.

The guest OS 130-2 uses the OS PF driver 204 to access the PFs 210 of the HBA 105, and sets a given value to the VF Enable bit of the IOV register 211 to enable VF-1-1 to VF-1-n.

This embodiment gives an example in which the virtual machine 120-2 and the guest OS 130-2 are booted in advance and the virtual machine 120-1 and the guest OS 130-1 are then booted.

The iSCSI target server 205 of the guest OS 130-2 is used to boot the virtual machine 120-1 and the guest OS 130-1. The virtual machine 120-1 is provided with a virtual UEIF 193 by the hypervisor 140. The virtual UEIF 193 includes the UEIF iSCSI driver 201 which uses the iSCSI target server 205 of the guest OS 130-2.

After the virtual machine 120-1 is booted with the use of the UEFI iSCSI driver 201, the guest OS 130-1 in which the OS VF driver 203 is loaded is booted. The guest OS 130-1 uses one of the VFs 212 (for example, VF-1-1) of the HBA 105 to access the storage 150 from the OS VF driver 203.

The hypervisor 140 which assigns computer resources of the physical computer 100 to the virtual machines 120 includes the adapter assignment table 231 for managing relations between the IO adapter and the virtual machines 120, the storage assignment table 232 for managing relations between the storage 150 and the virtual machines 120, and the access path management table 233 for managing access paths from the respective virtual machines 120 to the storage 150.

The hypervisor 140 executes the UEFI event monitor 222 for monitoring the behavior of the virtual UEFI 193 of the relevant virtual machines 120. The UEFI event monitor 222 monitors for the completion of a UEFI boot service, which is an event where control switches from the UEFI 193 to the guest OS 130-1, and notifies the hypervisor 140 of the completion. The hypervisor 140 also executes the virtual NIC emulator 221 in order to share the physical NIC 104 among a plurality of virtual machines.

Function modules of the hypervisor 140 are loaded as programs in the main memory 110. The CPU 101 operates as function modules that implement given functions by operating as programmed by the programs of the function modules of the hypervisor 140. For example, the CPU 101 functions as the UEFI event monitor 222 by operating as programmed by a UEFI event monitoring program. The same applies to other programs. The CPU 101 also operates as function modules that implement a plurality of processing procedures executed by the respective programs.

Programs, tables, and other types of information for implementing the functions of the hypervisor 140 and the guest OSs 130 can be stored in the storage 150, a storage device such as a non-volatile semiconductor memory, a hard disk drive, or a solid state drive (SSD), or a computer-readable, non-transient data storage medium such as an IC card, an SD card, or a DVD.

The UEFI 191 in this embodiment utilizes a boot manager for booting the hypervisor 140, and functions as an input/output management unit that manages the input/output of the hardware of the physical computer 100. The virtual UEFI 192 and the virtual UEFI 193 which are provided by the hypervisor 140 are used as boot managers for booting the virtual machines 120, and function as input/output management modules that manage the input/output of the virtual machines 120.

FIGS. 3A to 3C illustrate adapter assignment tables according to the first embodiment of this invention. FIG. 3A illustrates a virtual NIC (VNIC in the drawing) assignment table 300, which is provided by the virtual NIC emulator 221. FIG. 3B illustrates an assignment table 310 of the PFs 210 of the HBA 105. FIG. 3C illustrates an assignment table 320 of the VFs 212 of the HBA 105.

In the virtual NIC assignment table 300 of FIG. 3A, each entry is constituted of a field for a VNIC#301 where the identifier of a virtual NIC is stored and a field for a virtual machine number 302 where the identifier of a virtual machine is stored. In the illustrated example, a virtual NIC (VNIC0) and a virtual NIC (VNIC1), which are provided by the virtual NIC emulator 221, are assigned to the virtual machine (#0) 120-2 and the virtual machine (#1) 120-1, respectively.

In the assignment table 310 of the PFs 210 of the HBA 105 of FIG. 3B, each entry is constituted of a field for a PF#311 where the identifier of a PF is stored and a field for a virtual machine number 302 where the identifier of the virtual machine 120 to which the PF 210 identified by the PF#311 is assigned is stored. In the illustrated example, PFs PF-1 and PF-2 are assigned to the virtual machine (#0) 120-2.

In the assignment table 320 of the VFs 212 of the HBA 105 of FIG. 3C, each entry is constituted of a field for a PF#311 where the identifier of a PF is stored, a field for a VF#321 where the identifier of a VF under the PF 210 is stored, and a field for a virtual machine number 302 where the identifier of the virtual machine 120 to which the VF 212 is assigned is stored. In the illustrated example, the VF-1-1 under the PF-1 is assigned to the virtual machine (#1) 120-1.

The collective term for the assignment tables 300 to 320 of FIGS. 3A to 3C is the adapter assignment table 231 of FIG. 2.

FIG. 4 illustrates the storage assignment table 232 according to the first embodiment of this invention. In the storage assignment table 232, each entry is constituted of a field for the virtual machine number 302 where the identifier of one of the virtual machines 120 is stored, a field for an LUN 401 where the identifier of a logical unit (LU) of the storage 150 that is assigned to this virtual machine is stored, a field for a WWN 402 where the World Wide Name of the logical unit is stored, and a field for an iSCSI name 403 where the identification name of an iSCSI of the logical unit is stored. In FIG. 4, an entry 411 shows a storage assignment for an iSCSI path and an entry 412 shows an assignment of the storage 150 for a path that runs through the HBA 105.

FIGS. 5A and 5B illustrate the access path management table 233 and an access path management table 233' according to the first embodiment of this invention. FIG. 5A illustrates how the access path management table 233 looks when a path from the virtual machine 120-1 to be booted to the iSCSI target server 205 is selected. Each entry of the access path management table 233 is constituted of a field for the virtual machine number 302 where the identifier of a virtual machine is stored, a field for the LUN 401 where the identifier of a logical unit that is assigned to the virtual machine is stored, a field for a PF 501 where the selection state of the relevant PF 210 of the HBA 105 is stored, a field for a VF 502 where the selection state of the relevant VF 212 is stored, and a field for an iSCSI 503 where the selection state of the relevant iSCSI is stored. The selection state of these fields uses a value "1", which means enabled=selected, and a value "0", which means disabled=not selected.

The access path management table 233' of FIG. 5B illustrates an example in which the virtual machine (#1) 120-1 access a logical unit LUN0 of the storage 150 via the relevant VF 212 and the virtual machine (#0) 120-2 accesses logical units LUN0 and LUN1 of the storage 150 via the relevant PF 210.

Figure 6:
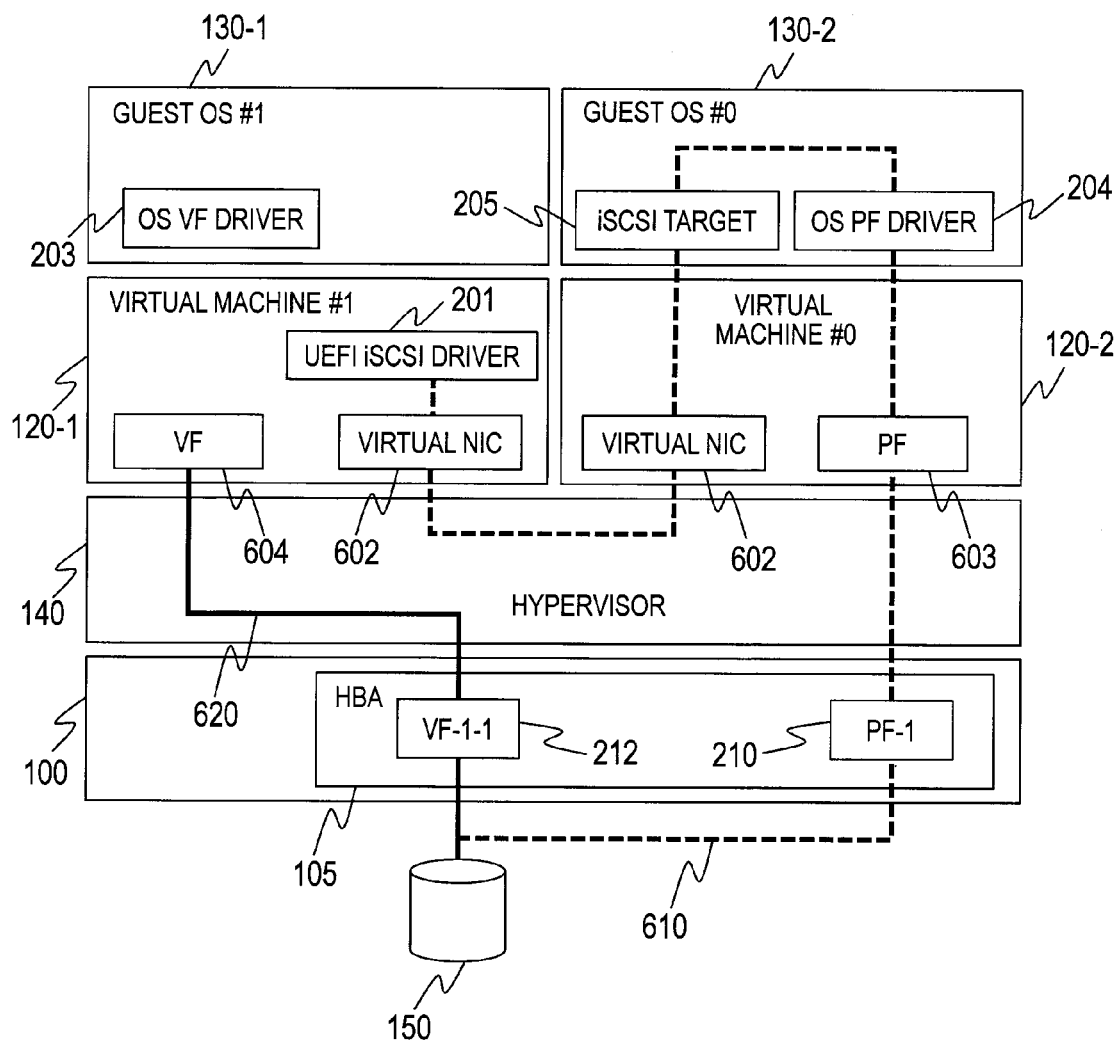
FIG. 6 is a block diagram illustrating an example of access paths according to the first embodiment of this invention.

FIG. 6 is a block diagram illustrating an example of access paths according to the first embodiment of this invention. In FIG. 6, reference numeral 150 denotes storage assigned to the virtual machine (#1) 120-1 to be booted; 602, virtual NICs; 202, a PF; 604, a VF; 610, an access path that uses an iSCSI (first access path); and 620, an access path that uses a VF (second access path). Details of the processing are described later.

Figure 7:
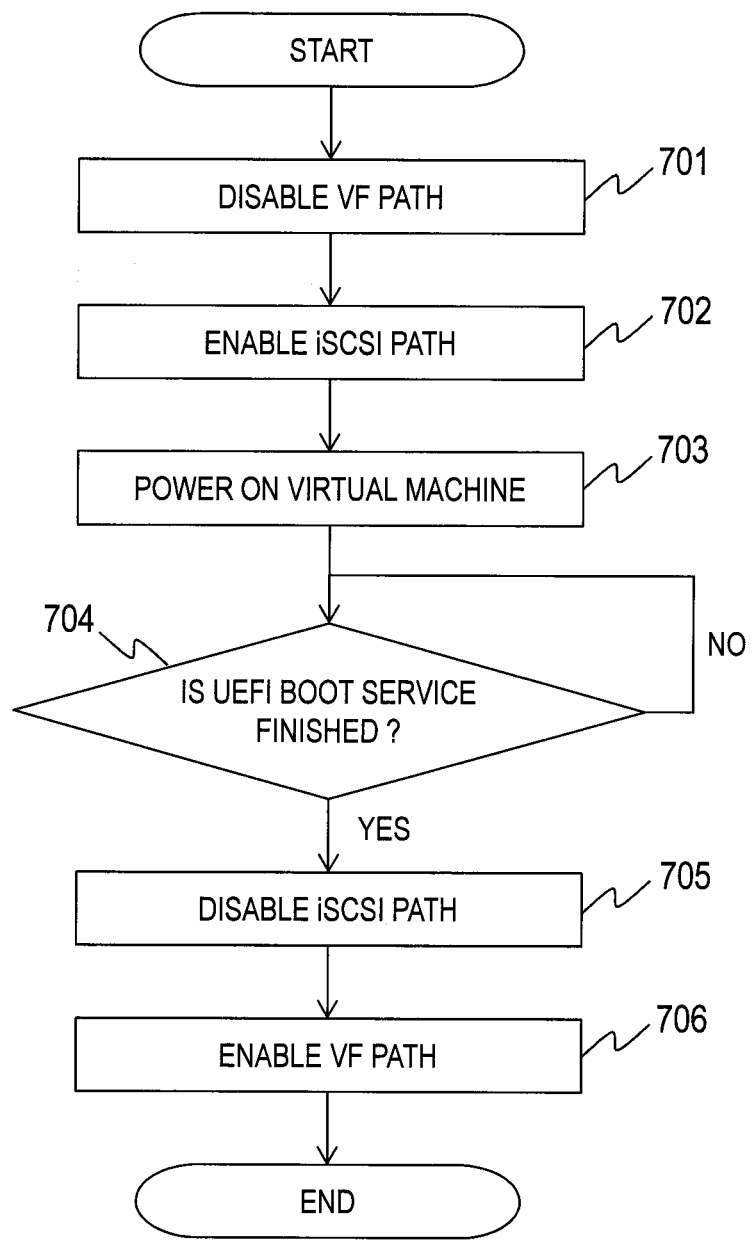
FIG. 7 is a flow chart for switching access paths according to the first embodiment of this invention.

FIG. 7 is a flow chart for switching access paths according to the first embodiment of this invention. Steps of this flow chart are executed when the hypervisor 140 boots the virtual machine (#1) 120-1. In FIG. 7, Step 701 is for disabling the path 620, which is used to access the storage 150 from the relevant VF 212. Specifically, the hypervisor 140 blocks the path leading to the VF 212 (VF-1-1), or may prohibit access from the VF 212 to the storage 150.

Step 702 is for enabling a path that is used by the virtual machine (#1) 120-1 to access the storage 150 from the relevant PF 210 via the iSCSI target server 205. This connects the virtual machine (#1) 120-1 to the storage 150 via the PF 210.

Step 703 is for powering the virtual machine (#1) 120-1 on with the use of the hypervisor 140.

Step 704 is for detecting the completion of the boot service, which is provided by the UEFI 193, with the use of the UEFI event monitor 222 of the hypervisor 140. When the UEFI event monitor 222 detects the completion of the boot service as a result of monitoring the UEFI 193, the hypervisor 140 proceeds to Step 705.

Step 705 is for disabling the path that is used to access the storage 150 from the iSCSI target server 205.

Step 706 is for enabling the path that is used to access the storage 150 from the VF 212.

Through the above processing, the virtual machine (#1) 120-1 can be booted without using a UEFI VF driver as described later.

In the first embodiment of this invention, two virtual machines (#0 and #1) 120-2 and 120-1 are generated above the hypervisor 140 in the software stack. The virtual machine (#1) 120-1 which is booted later is a virtual machine to which booting according to this invention is applied, and the guest OS (#0) 130-2 of the virtual machine (#0) 120-2 which is booted first provides an iSCSI target function.

The guest OS (#1) 130-1 which is to be booted according to this invention is booted on the virtual machine (#1) 120-1 and, at this point, the guest OS (#0) 130-2 on the virtual machine (#0) 120-2 provides the iSCSI target function.

The virtual machine (#0) 120-2 which is booted first is booted by accessing the storage 150 from the relevant PF 210 of the HBA 105. For that reason, the virtual UEFI 192 of the virtual machine (#0) 120-2 is equipped with the UEFI PF driver 202 and the guest OS (#0) 130-2 is equipped with the OS PF driver 204. The guest OS (#0) 130-2 which provides the iSCSI target function executes the iSCSI target server 205.

The guest OS (#0) 130-2 reads the OS PF driver 204 and sets the VF enable bit in the IOV register 211 of the relevant PF 210, to thereby enable the relevant VF 212 of the HBA 105. While FIG. 2 shows PF-1, which is the first PF in the drawing, and VF-1-1 to VF-1-$n$, which are associated with PF-1, this can similarly be applied to the case where there is a plurality of PFs.

The virtual NIC emulator 221 in the hypervisor 140 generates virtual NICs and assigns the virtual NICs to the virtual machines 120-1 and 120-2 in order to share the physical NIC 104 among the plurality of virtual machines 120 via virtual switches. The virtual NICs are not shown in FIG. 2. The virtual switches are generated in the hypervisor 140 to allow the virtual machines 120 to communicate with one another.

The guest OS (#1) 130-1 on the virtual machine (#1) 120-1 uses the relevant VF 212 as a boot device. The guest OS (#1) 130-1 is therefore equipped with the OS VF driver 203.

The UEFI 193 which is provided by the hypervisor 140 to the virtual machine (#1) 120-1, on the other hand, has the UEFI iSCSI driver 201 instead of a UEFI VF driver. In short, the booting of the virtual machine (#1) 120-1 does not use a UEFI VF driver and therefore does not require IO adapter vendors to provide a UEFI VF driver. This cuts down the development cost for IO adapter vendors.

The adapter assignment tables 231 illustrated in FIGS. 3A to 3C are used to manage information of an IO adapter assigned to the virtual machines 120. The adapter assignment tables 231 are made up of the virtual NIC assignment table 300, the PF assignment table 310, and the VF assignment table 320. Values "#0" and "1" of the virtual machine number 302 correspond to the virtual machine 120-2 and the virtual machine 120-1, respectively. The virtual machine (#0) 120-2 is assigned a virtual NIC VNIC0 and the PFs PF-1 and PF-2. The virtual machine (#1) 120-1 is assigned a virtual NIC VNIC1 and the VF denoted by VF-1-1. The VF denoted by VF-1-2 is not assigned to any of the virtual machines.

The storage assignment table 232 of FIG. 4 is used to manage information of the storage 150 assigned to the virtual machines 120. Values "#0" and "#1" of the virtual machine number 302 in the storage assignment table 232 correspond to the virtual machine (#0) 120-2 and virtual machine (#1) 120-1 of FIG. 2, respectively.

The virtual machine whose virtual machine number 302 is "#0" in the storage assignment table 232 is assigned two logical units of the storage 150, the logical units LUN0 and LUN1. The logical unit LUN0 is assigned only a WWN, which indicates that LUN0 is storage used by the virtual machine (#0) 120-2. The logical unit LUN1 in FIG. 4 is assigned the WWN 402 and the iSCSI name 403 both. The virtual machine (#0) 120-2 executes the iSCSI target server 205 and can expose a part of the storage 150 that is assigned to the virtual machine (#0) 120-2 to other computers as an iSCSI target device. The entry 411 of FIG. 4 indicates that the virtual machine (#0) 120-2 provides the logical unit LUN1 of the storage 150 to other computers as an iSCSI target.

The virtual machine (#1) 120-1 is assigned the logical unit LUN0 of the storage 150. The logical unit LUN0 is assigned the WWN 402 and the iSCSI name 403 both as illustrated in FIG. 4. This indicates that the virtual machine (#1) 120-1, which does not have an iSCSI target server, mounts an iSCSI target device instead of exposing an iSCSI target device. In other words, the entry where LUN is 0 indicates that the same part of the storage 150 has two access paths, an access path of the HBA 105 and an iSCSI access path.

Notice that the entries 411 and 412 in the storage assignment table 232 of FIG. 4 are for the same storage. When the virtual machine (#1) 120-1 uses the logical unit LUN0 as an iSCSI target, the logical unit LUN1 of the virtual machine (#0) 120-2 is used.

This is schematically illustrated in FIG. 6. The storage 150 corresponds to the storage of the entries 411 and 412 in the storage assignment table 232 of FIG. 4. The path 610 indicated by the dashed line in FIG. 6 is the path that uses an iSCSI, and the path 620 indicated by the solid line in FIG. 6 is the path that directly uses the HBA 105.

The access path management tables 233 and 233' illustrated in FIGS. 5A and 5B are used to manage which of the path of the HBA 105 and the path of the iSCSI target server 205 is used to access the storage 150.

The access path management table 233 of FIG. 5A illustrates a state where the path of the iSCSI target server 205 is selected, and the access path management table 233' of FIG. 5B illustrates a state where the path that directly accesses the HBA 105 is selected. In the access path management tables 233 and 233', which of the relevant PF 210 and the relevant VF 212 is used is further managed with respect to the path of the HBA 105. Entries 511 and 512 in the access path management table 233 of FIG. 5A correspond to the entries 411 and 412 in the storage assignment table 232 of FIG. 4, respectively.

The access path management table 233 of FIG. 5A shows that the virtual machine (#0) 120-2 accesses LUN0 and LUN1 from the relevant PF 210 of the HBA 105, and that the virtual machine (#1) 120-1 accesses LUN0 via the iSCSI target 205.

The access path management table 233' of FIG. 5B shows that the virtual machine (#0) 120-2 accesses LUN0 from the relevant PF 210 of the HBA 105, and that the virtual machine (#1) 120-1 accesses LUN0 from the relevant VF 212 of the HBA 105. The access path management table 233' of FIG. 5B is set so that the virtual machine (#0) 120-2 does not access LUN1.

Entries 511' and 512' in the access path management table 233' of FIG. 5B are for the same part of the storage 150. The entry 511' of FIG. 5B is created in order for the virtual machine (#0) 120-2 to provide the storage 150 to the virtual machine (#1) 120-1 as an iSCSI target device. The entries 511' and 512' of FIG. 5B therefore need to be set so as to maintain consistency. For example, in order for the virtual machine (#1) 120-1 to access the storage 150 with the use of the iSCSI driver 201 in the entry 512 of the access path management table 233 of FIG. 5A, "disabled", i.e., "0" is set in the field for the selection state 502 of the relevant VF 212 whereas "enabled", i.e., "1" is set in the field for the iSCSI selection state 503, and "1" is further set in the field for the selection state 501 of the relevant PF 210 in the entry 511 in order for the virtual machine (#0) 120-2 to expose the storage 150 via the iSCSI target server 205.

To give another example, in order for the virtual machine (#1) 120-1 to access the storage 150 from the relevant VF 212 of the HBA 105 instead of the iSCSI in the entry 512 of the access path management table 233 of FIG. 5A, "1" is set in the field for the VF selection state 502 of the relevant VF 212 whereas "0" is set in the field for the iSCSI selection state 503 in the entry 512' of the access path management table 233' of FIG. 5B, and "0" is further set in the field for the PF selection state 501 of the relevant PF 210 in the entry 511' in order for the virtual machine (#0) 120-2 to stop the exposure of the storage of the iSCSI target server 205.

Whether the storage 150 of the iSCSI target 205 is enabled or disabled is controlled here by determining whether or not the storage 150 can be accessed from the relevant PF 210 as in the entry 511 of the access path management table 233 of FIG. 5A and the entry 511' of the access path management table 233' of FIG. 5B. However, how to control the enabling/disabling of the exposure of the storage 150 of the iSCSI target 250 is not limited to this method. Changing a settings file (not shown) of the iSCSI target server 205 or any other methods can be used.

This embodiment has a feature that, when the same part of the storage 150 has a plurality of access paths, such as a path of the HBA 105 and a path of the iSCSI target 205, the access path management table 233 always enables only one of the access paths. Because only one access path is enabled at a time even when the same part of the storage 150 has a plurality of access paths, this embodiment has an effect of preventing access competition among a plurality of access paths.

A method of booting the virtual machines and the guest OSs 130 according to this invention is described next with reference to FIG. 7. Other drawings than FIG. 7 are referred to as well when describing the state of the various management tables.

The physical computer 100 is booted roughly in the following four steps:

(1) reading a master boot record out of the storage 150;
(2) reading a boot loader out of the storage 150;
(3) reading a boot image out of the storage 150; and
(4) reading a file necessary for the booting out of the storage 150.

Steps (1) to (3) are processed by the UEFI and therefore processed by the UEFI driver. In Step (4), after control by the UEFI is finished, the OS takes over control to execute processing of reading out of the storage 150, and the OS driver (PF) of the HBA 105 which is included in the boot image therefore reads a file necessary for the booting out of the storage 150. In the booting of the physical computer 100, two drivers, the UEFI PF driver 202 and the OS PF driver 204, may continue the reading out of the storage 150.

The virtual machine (#1) 120-1 is booted in the same steps as the booting steps (1) to (4) of the physical computer 100 described above. A UEFI VF driver is therefore indispensable when the virtual machines 120 use the VFs 212 as a boot device. A feature of this invention resides in that the guest OS (#1) 130-1 on the virtual machine (#1) 120-1 is booted by the relevant VF 212 of the HBA 105, which is an IO adaptor (HBA 105) in conformity to SR-IOV, without using a UEFI VF driver.

The role of a UEFI driver is to deploy the boot image read out of the storage 150 via the HBA 105 onto the main memory 110 and to hand over control to the OS. This invention uses the UEFI iSCSI driver 201 instead of a UEFI VF driver. Accordingly, path switching from a path that uses the iSCSI target server 205 to access the storage 150 from the relevant PF 210 to a path for accessing the storage 150 from the relevant VF 212 of the HBA 105 takes place during the booting of the virtual machine 120-1 and the guest OS 130-1.

As illustrated in FIG. 6, before the virtual machine (#1) 120-1 is booted, the hypervisor 140 needs to disable the path 620 (solid line) from the virtual machine (#1) 120-1 to the relevant VF 212 and then enable the path 610 (dashed line) of the iSCSI target server 205.

In Step 701 of FIG. 7, the hypervisor 140 disables the path 620 from the virtual machine (#1) 120-1 to the relevant VF 212. The hypervisor 140 executes the following processing in Step 701:

The hypervisor 140 refers to the access path management table 233 of FIG. 5A to disable the path 620 of the relevant VF 212. Specifically, the hypervisor 140 sets "disabled", i.e., "0", in the field for the VF selection state 502 of the virtual machine 120-1 to be booted.

In Step 702 of FIG. 7, the hypervisor 140 enables the iSCSI path 610. The hypervisor 140 executes the following processing in Step 702:

The hypervisor 140 refers to the access path management table 233 of FIG. 5A to enable the iSCSI path 610. Specifically, the hypervisor 140 sets "enabled", i.e., "1", in the field for the iSCSI selection state 503 of the virtual machine to be booted in the access path management table 233. Executing Steps 701 and 702 yields the entry 512 in the access path management table 233 of FIG. 5A.

The access path that is to be set when a virtual machine is powered on has thus been set, and the hypervisor 140 proceeds to Step 703 of FIG. 7 to power on the virtual machine (#1) 120-1. At this point, the virtual machine (#1) 120-1 uses the path 610 (dashed line) of FIG. 6 to access the storage 150. To describe in more detail, the UEFI iSCSI driver 201 of the virtual machine (#1) 120-1 accesses the iSCSI target server 205 via the virtual NICs 602 of the hypervisor 140, and the iSCSI target server 205 accesses the storage 150 via the OS PF driver 204 with the use of the virtual PF 603 and the relevant PF 210 (PF-1). The virtual PF 603 is a virtual device generated by the hypervisor 140 in association with the UEFI PF driver 202.

The UEFI 193 of the virtual machine (#1) 120-1 uses the UEFI iSCSI driver 201 to read a master boot record out of the storage 150 via the virtual NICs 602, the iSCSI target server 205, the OS PF driver 204, the virtual PF 603, and the relevant PF 210 of the HBA, reads a boot loader defined in the master boot record, reads a boot image defined in the boot loader, and deploys the boot image onto the main memory 110. Once the boot image is stored in the main memory 110, the UEFI 193 of the virtual machine (#1) 120-1 ends the processing and hands over control to the guest OS (#1) 130-1.

At the time the guest OS (#1) 130-1 takes over control from the UEFI 193, the UEFI 193 generates a boot service exit event. In Step 704, the UEFI event monitor 222 of the hypervisor 140 monitors events of the UEFI 193 and, when boot service exit is detected, the hypervisor 140 proceeds to Step 705.

After the event for exiting from the boot service of the UEFI 193, the guest OS (#1) 130-1 takes over control from the UEFI 193, and the OS VF driver 203 accesses the storage 150. In other words, the guest OS (#1) 130-1 uses the relevant VF 212 of the HBA 105 to access the storage 150 in this case. The access path is therefore switched during the booting from the iSCSI path 610 of FIG. 6 (the dashed line in the drawing) to the path 620 of the VF-1-1 (the solid line in the drawing) by disabling the iSCSI path 610 and enabling the path 620 of the VF-1-1.

In Step 705 of FIG. 7, the iSCSI path 610 is disabled. The hypervisor 140 executes the following processing in Step 705:

The hypervisor 140 refers to the access path management table 233' of FIG. 5B to disable the iSCSI path 610. Specifically, the hypervisor 140 sets "0" in the field for the iSCSI selection state 503 of the virtual machine (#1) 120-1 to be booted.

In Step 706, the hypervisor 140 enables the path 620 of the relevant VF 212 from the guest OS 130-1. The hypervisor 140 executes the following processing in Step 706:

The hypervisor 140 refers to the access path management table 233' of FIG. 5B to enable the path 620 of the relevant VF 212. Specifically, the hypervisor 140 sets "1" in the field for the VF selection state 502 of the virtual machine (#1) 120-1 to be booted. Executing Steps 705 and 706 yields the entry 512' in the access path management table 233' of FIG. 5B.

This completes access path switching that is executed after the guest OS 130-1 takes over control from the UEFI 193 of the virtual machine (#1) 120-1 to be booted. The processing is then ended. At this point, the guest OS (#1) 130-1 of the virtual machine (#1) uses the path 620 of FIG. 6 to access the storage 150 from the relevant VF 212 of the HBA 105. In other words, the OS VF driver 203 accesses the storage 150 by using the VF 604, which is a virtual device, and the relevant VF 212. The VF 604 of FIG. 6 is a virtual device that corresponds to VF-1-1 provided by the hypervisor 140.

A method of booting the virtual machine 120-1 and the guest OS 130-1 has been described in this embodiment. For reference, a description is given below on a method of installing the guest OS 130-1 and settings of the method of booting the virtual machine (#1) 120-1.

The guest OS 130-1 is installed with the use of a DVD (omitted from the drawings), a network, or other usual means of OS installation. A case of installing the guest OS 130-1 with the use of a DVD is described here.

The installation of the guest OS 130-1 does not use the iSCSI and only uses the relevant VF 212 of the HBA 105. The storage assignment table 232 is therefore set so that the virtual machine 120-1 uses the relevant VF 212 alone. In other words, the settings of the entry 512' in the access path management table 233' of FIG. 5B are employed.

In order to boot the virtual machine 120-1 from the OS installation DVD, the DVD is set as a boot device of the UEFI 193 of the virtual machine 120-1. The OS installation DVD is loaded in a DVD drive (omitted from the drawings) coupled to the physical computer 100, and the virtual machine 120-1 is then powered on. When the installation of the guest OS 130-1 is started, the OS VF driver 203 is installed as an added device. The storage 150 accessed from the relevant VF 212 is specified as a place where the guest OS 130-1 is installed. Booting the virtual machine 120-1 with the OS installation DVD is not enough to enable the VF 212, which means that the storage 150 cannot be used. However, introducing the OS VF driver 203 during the installation makes the storage 150 available for use as a place where the guest OS 130-1 is installed.

After the installation of the guest OS 130-1 is completed, the iSCSI is set as the boot device of the UEFI 193.

In OS installation of the prior art example, the HBA 105 which has been used in the installation is set as a boot device of the UEFI. In contrast, this invention has a feature of setting as a boot device of the UEFI 193 the iSCSI which has not been used in the installation of the guest OS 130-1. Lastly, a virtual machine management table (the illustration of which is omitted) of the hypervisor 140 is set so that the virtual machine 120-1 is booted by the method of this invention. The hypervisor 140 refers to the virtual machine management table when the virtual machine 120-1 is booted, and changes the boot processing by determining whether the virtual machine 120-1 to be booted is booted by the method of this invention or by the usual booting procedure. Changing the boot processing involves changing the settings of the monitoring subject of the UEFI event monitor 222, settings of the access path management table 233, and the like.

This embodiment has a feature that, while the iSCSI path 610 and the path 620 of the relevant VF 212 are prepared for the same part of the storage 150, the access path management table 233 is used to control access so that only one of the paths is put into use. With a type of OS that records the progress of boot phases of the virtual machine 120-1 and the guest OS 130-1 in storage, access competition and data inconsistency may occur when there are two access paths for the same storage. It is therefore necessary to enable only one of the access paths by some means.

This embodiment uses the access path management table 233 to exert control so that only one of the access paths is active. However, this invention is not limited to this method and any other methods can be used. For example, a control method may be employed in which the UEFI 193 hides the virtual hardware configuration of the virtual machine 120-1 to the virtual NICs 602, which support the iSCSI, from the view of the guest OS 130-1. With this method, the UEFI 193 can use the virtual NICs 602 but the guest OS 130-1 cannot use the virtual NICs 602. In short, access path switching is accomplished.

This embodiment describes a method of booting the virtual machine 120-1 from the relevant VF 212 when there is no UEFI VF driver. The method can similarly be applied to the case where a virtual machine is booted from a PF when there is no UEFI PF driver.

The iSCSI target server 205 is executed on the virtual machine 120-2 in this embodiment, but can be run in other places than a virtual machine. For example, the iSCSI target server may be executed by the hypervisor 140.

The OS PF driver 204 is executed by the guest OS 130-2 on the virtual machine 120-2 in this embodiment, but can be executed in other places than a virtual machine. For example, the OS PF driver 204 may be executed by the hypervisor 140. In the case where the OS PF driver 204 is executed on a virtual machine, a virtual machine that executes the OS VF driver 203 cannot be booted until the virtual machine that executes the OS PF driver 204 is booted.

In the case where the OS PF driver 204 is run by the hypervisor 140, on the other hand, any virtual machine can be booted first because the VFs 212 are enabled when the hypervisor 140 sets the VF Enable bit in the IOV register 211.

In this embodiment, the iSCSI path 610 is prepared in addition to the path 620 of the relevant VF 212 for the same part of the storage 150, and is used for access to execute the step of reading a boot image and preceding steps. However, any other paths than an iSCSI path can be used. For example, in the case where the hypervisor 140 provides virtual ATA to virtual machines by emulation, a path of the virtual ATA can be used.

The boot method described in this embodiment uses the relevant VF 212 of the HBA 105, but the type of IO adapter that can be used in this invention is not limited to the HBA 105. This invention can be applied to an IO adapter capable of deducing by analogy the flow that hands over control to the OS after the boot image is deployed onto the main memory. For example, this invention is applicable to network boot which uses the NIC 104. In this case, the virtual NICs 602 deploy a boot image from the network 160 onto the main memory 110 and, after processing shifts to the OS included in the boot image, the VF of the NIC 104 reads remaining files. This invention can similarly be applied to iSCSI boot.

Second Embodiment

While a case of using a UEFI to boot a virtual machine is described in the first embodiment, this invention is also applicable to a case where a BIOS is used to boot a virtual machine. A UEFI issues a boot service exit event when the OS takes over control from the UEFI. When to switch access paths can therefore be determined by monitoring events of the UEFI and detecting a boot service exit event. A BIOS, on the other hand, does not issue an event when the OS takes over control. It is therefore necessary to determine when to switch access paths by other means than event monitoring. For example, the start of the use of (the start of the setting of) the IO adapter by the OS can be used as switch timing.

A second embodiment of this invention describes a configuration and processing for the case where a BIOS is used to boot a virtual machine. This embodiment has a feature that, in a virtual machine booted with the use of a BIOS, two access paths are provided for one boot device to switch from one of the access paths to the other when the start of the use of (the start of the setting of) an IO adapter by an OS is detected during the booting. The part of the configuration of the second embodiment that does not concern the UEFI and the BIOS is the same as the first embodiment, and a description thereof is omitted here.

Figure 8:
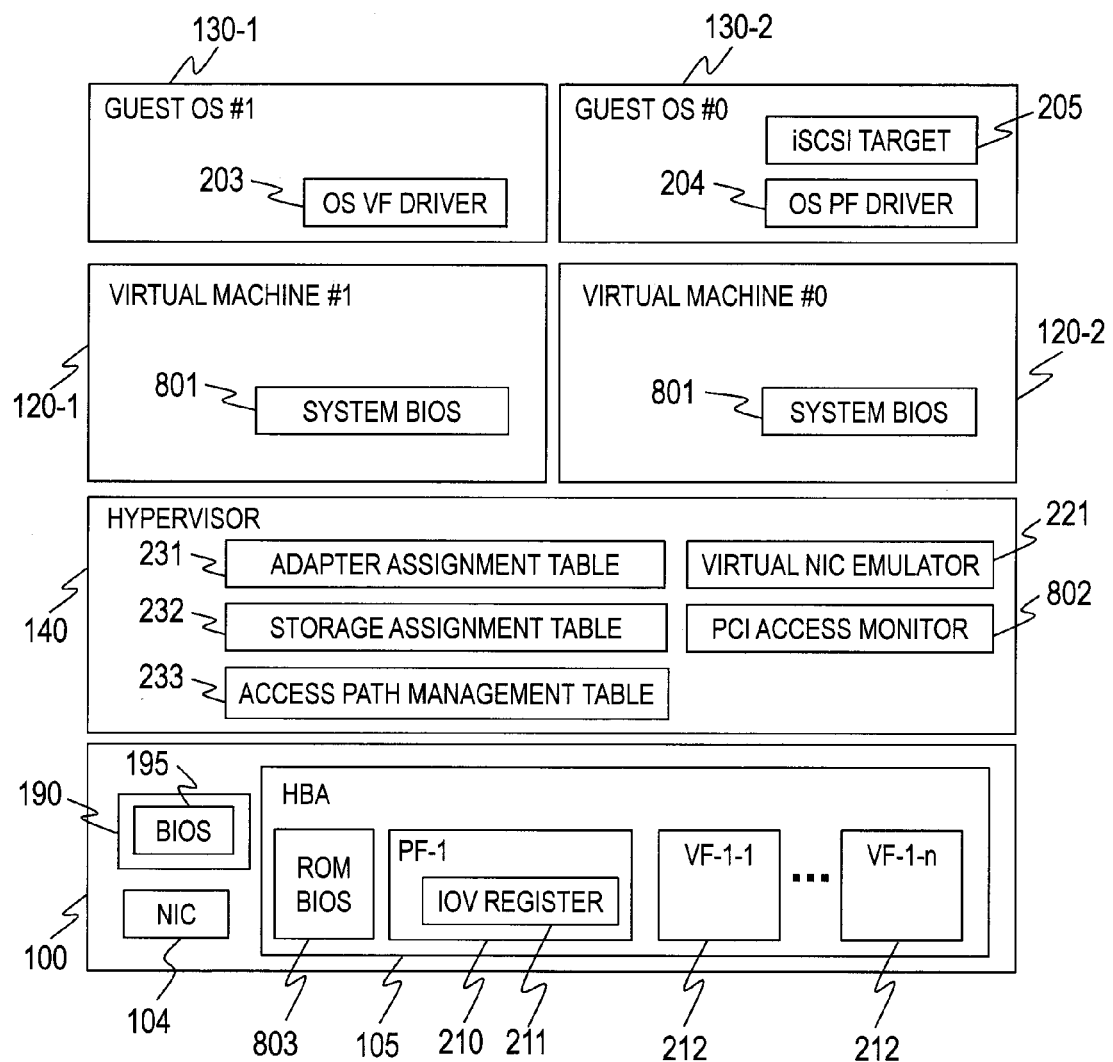
FIG. 8 is a block diagram illustrating an example of a physical computer and a software stack according to the second embodiment of this invention.

FIG. 8 is a block diagram illustrating an example of a physical computer and a software stack according to the second embodiment of this invention. In FIG. 8, a BIOS 195 is stored in the ROM 190 and the HBA 105 is equipped with a ROM BIOS 803. The hypervisor 140 has a PCI access monitor 802 for monitoring access of a PCI device of the guest OS (#1) 130-1, in place of the UEFI event monitor 222 of the first embodiment. The hypervisor 140 also provides a virtual system BIOS 801 to each of the virtual machine (#1) 120-1 and the virtual machine (#0) 120-2. The rest of the configuration of the second embodiment is the same as the first embodiment.

The BIOS 195 in the second embodiment functions as an input/output management unit that manages the input/output of the hardware of the physical computer 100 when the hypervisor 140 is booted. The virtual system BIOSs 801 which are provided by the hypervisor 140 function as input/output modules that manage the input/output of the virtual machines 120 when the guest OSs 130 are booted.

Figure 9:
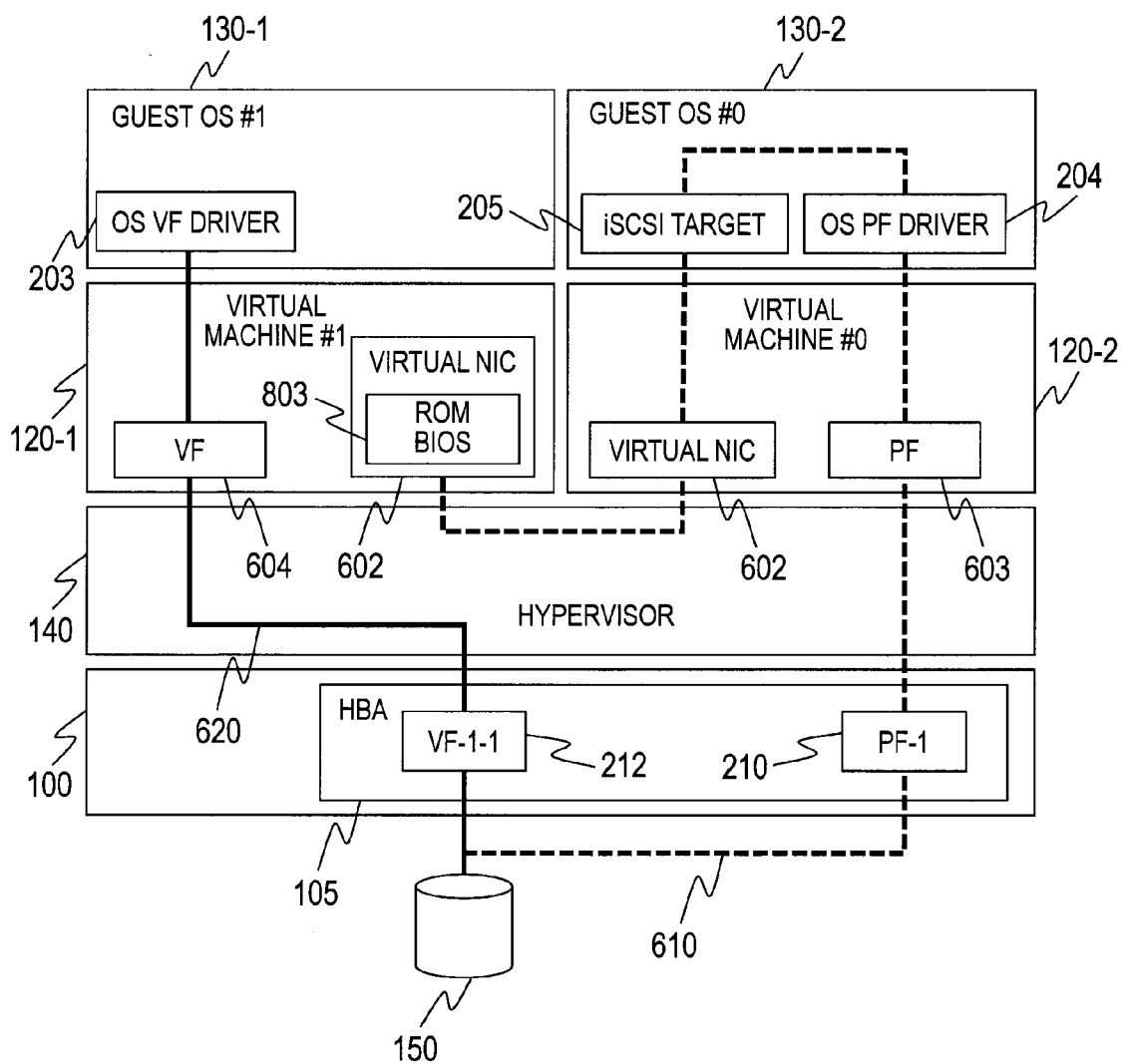
FIG. 9 is a block diagram illustrating an example of access paths according to the second embodiment of this invention.

FIG. 9 is a block diagram illustrating an example of access paths according to the second embodiment of this invention. In FIG. 9, reference numeral 910 denotes an access path that uses the iSCSI target server 205 via the virtual NIC 602 of the guest OS (#1) 130-1 to access the storage 150 from the relevant PF 210. The path 620 is the same as in the first embodiment, and is used to access the storage 150 from the guest OS (#1) 130-1 via VF-1-1.

FIG. 10 is a flow chart of access path switching that is executed at the time of booting according to the second embodiment of this invention. In FIG. 10, Step 1001 is for detecting that the guest OS (#1) 130-1 has accessed a PCI configuration space in order to initialize a VF. When the PCI access monitor 802 of the hypervisor 140 detects that the guest OS (#1) 130-1 has accessed the PCI configuration space, the hypervisor 140 proceeds to Step 705 to switch the access path to the storage 150 in the manner described in the first embodiment. The rest of the processing is the same as in the first embodiment.

This embodiment uses the PCI access monitor 802 to monitor for access to the PCI config space by the guest OS (#1) 130-1, and has a feature of determining that it is safe to switch the access path from the iSCSI path 910 to the path 620 of the relevant VF 212 at the time the PCI access monitor 802 detects access to the PCI configuration space by the VF 212 of the HBA 105, namely, access by the guest OS 130-1 for setting the VF 212. Examples of access to the PCI configuration space by the guest OS 130-1 for setting the relevant VF 212 include the detection of a root or bridge of a PCI bus, the registration of a device under the root, and the incorporation of a device driver.

In the case where the guest OS 130-1 is booted with the use of a UEFI as in the first embodiment, UEFI boot service device drivers such as the UEFI iSCSI driver 201 and the UEFI PF driver 202 are used to read a master boot record, a boot loader, and a boot image out of the storage 150. In other words, the virtual machine is powered on with the UEFI device drivers already incorporated in the UEFI.

In the case where the guest OS (#1) 130-1 is booted with the use of the virtual system BIOS 801, on the other hand, a code corresponding to the UEFI boot service device drivers is included in the ROM BIOS 803, which is within the HBA 105, instead of the virtual system BIOS 801. The virtual system BIOS 801 therefore uses a program included in the ROM BIOS 803 to access the storage 150. The location of the program for accessing the storage 150 differs between the UEFI and the BIOS, but the procedure for accessing the storage 150 is essentially the same for the UEFI and the BIOS.

The essential difference between the UEFI and the BIOS 801 (195) lies in processing that is executed when the OS takes over control after the UEFI or the BIOS finishes processing. When the OS takes over control from the UEFI, the UEFI issues a boot service exit event. The UEFI is superior in the level and number of functions to the BIOS, and accordingly takes up a large space in the main memory. Therefore, when issuing a boot service exit event, the UEFI deletes codes that are not needed after the OS is booted from the main memory. The hypervisor 140 can detect that a boot service exit event has occurred by monitoring events that are issued by the UEFI.

The BIOS, on the other hand, does not issue an event when the OS takes over control from the BIOS because the BIOS takes up only a small space in the main memory 110 and accordingly remains in the main memory 110 after the OS is booted. It is therefore necessary to detect the shift of control from the BIOS to the OS by other means than event monitoring.

After taking over control from the BIOS, the OS scans the PCI bus to check what 10 adapter is available for use, then initializes an IO adapter to enable the IO adapter and, lastly, uses the IO adapter to access the storage 150 or other components. Access to the PCI configuration space of the PCI device occurs at the time the PCI bus is scanned and at the time an IO adapter is initialized.

In FIG. 9, the virtual NICs 602 and other IO adapters that are available for use from the moment the virtual machine 120-1 is powered on call for access to the PCI configuration space at the time of hardware initialization by the virtual system BIOS 801. Therefore, in the case of the virtual NICs 602, whether the shift of control from the BIOS to the OS has taken place or not cannot be determined by monitoring access to the PCI configuration space.

Access to the PCI configuration space by the relevant VF 212 of the HBA 105, on the other hand, occurs at the time the OS VF driver 203 is incorporated in the guest OS 130-1. In other words, a stage where the OS has taken over control but has not started using the relevant VF 212 can be identified by monitoring access to the PCI configuration space by the VF 212 of the HBA 105. At this stage, the virtual system BIOS 801 has finished accessing via the iSCSI path 910 and the guest OS 130-1 has not started accessing via the path 620 of the relevant VF 212, and the iSCSI path 910 can therefore be safely switched to the VF path 620. The PCI access monitor 802 monitors access to the PCI configuration space and, when detecting access to the PCI configuration space by the VFs 212 of the HBA 105, notifies the hypervisor 140 of the access.

A method of booting the virtual machines according to this invention is described next with reference to FIG. 10. Other drawings than FIG. 10 are referred to as well when describing the state of the various management tables.

The first embodiment uses the UEFI iSCSI driver 201 to implement the iSCSI path 610. This embodiment, on the other hand, uses the ROM BIOS 803 in the relevant virtual NIC 602 of FIG. 9 to implement the iSCSI path 910.

Before the virtual machine 120-1 is booted, it is necessary to disable the path 620 of the relevant VF 212 and enable the iSCSI path 910.

In Step 701 of FIG. 10, the path 620 of the relevant VF 212 is disabled. The iSCSI path 910 is enabled in Step 702. Executing Steps 701 and 702 yields the entry 512 in the access path management table 233 of FIG. 5A.

The access path 910 which is to be set when a virtual machine is powered on has thus been set, and the hypervisor 140 proceeds to Step 703 to power on the virtual machine 120-1. At this point, the virtual machine 120-1 uses the path 910 of FIG. 9 to access the storage 150. To describe in more detail, the ROM BIOS 803 of the relevant virtual NIC 602 accesses the iSCSI target server 205, and the iSCSI target server 205 accesses the storage 150 via the OS PF driver 204 with the use of the virtual PF 603 and the relevant PF 210 of the HBA 105.

In Step 1001 of FIG. 10, the PCI access monitor 802 detects access to the PCI configuration space by the virtual PF 604, and the hypervisor 140 then proceeds to Step 705.

After taking over control from the virtual system BIOS 801, the guest OS 130-1 accesses the storage 150 with the use of the OS VF driver 203. In other words, the guest OS 130-1 uses the relevant VF 212 to access the storage 150 in this case. The access path is therefore switched from the iSCSI path 910 to the path 620 of the relevant VF 212 by disabling the iSCSI path 910 and enabling the path 620 of the VF 212.

In Step 705, the iSCSI path 910 is disabled. The path 620 of the relevant VF 212 is enabled in Step 706. Executing Steps 705 and 706 yields the entry 512' in the access path management table 233' of FIG. 5B.

The access path that is to be set after the guest OS 130-1 takes over control from the virtual system BIOS 801 has thus been set and the processing is then ended. At this point, the virtual machine 120-1 uses the path 620 of FIG. 9 to access the storage 150. In other words, the OS VF driver 203 accesses the storage 150 by using the VF 604, which is virtual, and the relevant VF 212 of the HBA 105.

Thus, in the case where the virtual machine (#1) 120-1 and the guest OS (#1) 130-1 are booted by the virtual system BIOS 801, too, the OS VF driver 203 can continue to read a file necessary for the booting of the guest OS 130-1 out of the storage 150 via the relevant VF 212 of the HBA 105 as in the first embodiment once the guest OS (#1) 130-1 takes over control after a master boot record, a boot loader, and a boot image are read out of the storage 150 via the iSCSI target server 205, the OS PF driver 204, and the relevant PF 210. In the second embodiment, the shift of control from the virtual system BIOS 801 to the guest OS (#1) 130-1 is accomplished when the hypervisor 140 detects access to the PCI configuration space by the relevant VF 212 of the HBA 105. In other words, it is determined that the shift of control from the virtual system BIOS 801 to the guest OS (#1) 130-1 has taken place when the PCI access monitor 802 of the hypervisor 140 detects access to the PCI configuration space by the VF 212. The hypervisor 140 then switches the access path to the storage 150 from the path 910 of FIG. 9 to the path 620, thereby allowing the guest OS (#1) 130-1 to access the storage 150 with the use of the relevant VF 212 of the HBA 105.

The first embodiment and second embodiment described above thus show that, according to this invention, the virtual machines 120 can be used smoothly with an IO adapter that is in conformity to SR-IOV in the physical computer 100, which uses a UEFI or a BIOS.

The bus 106, which is a PCI bus in the examples of the first embodiment and the second embodiment, may constituted of a serial coupling such as a PCI express.

In the examples of the first embodiment and the second embodiment, the hypervisor 140 is employed as a virtualization module which provides computer resources of the physical computer 100 to the plurality of virtual machines 120. The virtualization module may instead be a Virtual Machine Manager (VMM).

As has been described, this invention can be applied to a virtual machine and a virtual machine system that include an IO adapter in conformity to SR-IOV.

While the present invention has been described in detail and pictorially in the accompanying drawings, the present invention is not limited to such detail but covers various obvious modifications and equivalent arrangements, which fall within the purview of the appended claims.

What is claimed is:

1. A virtual machine booting method for booting a virtual machine on a physical computer, wherein the physical computer includes a processor, a memory, and a virtual machine manager adapted to assign computer resources of the physical computer to the virtual machine, wherein the physical computer is coupled to a storage, the booting method comprising:
    a first step of setting, by the virtual machine manager, before the virtual machine is booted, states of a first access path and a second access path that both access the same part of the storage and both couple the virtual machine to the storage;
    a second step of booting the virtual machine by the virtual machine manager while the virtual machine and the storage are coupled via the first access path;
    a third step of determining, by the virtual machine manager, when to switch between the first access path and the second access path;
    a fourth step of switching from the first access path to the second access path when the virtual machine manager determines that a guest operating system included in a boot image of the virtual machine has taken over control; and
    wherein the first access path is between a first device and the storage, and the second access path is between the first device to a second device, which is different from the first device, and then to the storage.

2. The virtual machine booting method according to claim 1,
    wherein the first step comprises:
        a fifth step of disabling the second access path by the virtual machine manager; and
        a sixth step of enabling the first access path by the virtual machine manager, and
    wherein the fourth step comprises:
        a seventh step of disabling the first access path by the virtual machine manager; and
        an eighth step of enabling the second access path by the virtual machine manager.

3. The virtual machine booting method according to claim 2, wherein, in the third step, the virtual machine manager determines that it is time to switch between the first access path and the second access path when a notification of completion of the use of the first access path is received from the virtual machine.

4. The virtual machine booting method according to claim 2, wherein, in the third step, the virtual machine manager determines that it is time to switch between the first access path and the second access path when the virtual machine detects that the second access path has been set.

5. The virtual machine booting method according to claim 2, wherein the storage is coupled via an IO adapter which has a physical function and a virtual function, the first access path is coupled to the storage via the physical function, and the second access path is coupled to the storage via the virtual function.

6. The virtual machine booting method according to claim 5, wherein, in the eighth step, after the second access path is enabled, the virtual machine manager boots an operating system on the virtual machine, and the operating system uses the second access path via a driver of the virtual function.

7. A computer, comprising:
    computer resources which include a processor and a memory; and
    a virtual machine manager adapted to assign the computer resources of the computer to a virtual machine,
    wherein the computer is coupled to a storage, wherein the virtual machine manager comprises:
        an access path management module for setting states of a first access path and a second access path that both access the same part of the storage and both couple the virtual machine to the storage; and
        a switch timing determining module for determining when to switch between the first access path and the second access path, and
    wherein, when the virtual machine is booted, the access path management module couples the virtual machine and the storage by the first access path and, when the switch timing determining module determines that a guest operating system included in a boot image of the virtual machine has taken over control, the access path management module switches the first access path to the second access path to couple the virtual machine and the storage; and
    wherein the first access path is between a first device and the storage, and the second access path is between the first device to a second device, which is different from the first device, and then to the storage.

8. The computer according to claim 7,
    wherein, before the virtual machine is booted, the access path management module sets the second access path as a disabled path, then sets the first access path as an enabled path, and then boots the virtual machine, and
    wherein, when the switch timing determining module determines that it is time for the switching, the access path management module sets the first access path as the disabled path and then sets the second access path as the enabled path.

9. The computer according to claim 8, wherein the switch timing determining module determines that it is time to switch between the first access path and the second access path when a notification of completion of the use of the first access path is received from the virtual machine.

10. The computer according to claim 8, wherein switch timing determining module determines that it is time to switch between the first access path and the second access path when the virtual machine detects that the second access path has been set.

11. The computer according to claim 8, wherein the storage is coupled via an IO adapter which has a physical function and a virtual function, the first access path is coupled to the storage via the physical function, and the second access path is coupled to the storage via the virtual function.

12. The computer according to claim 11, wherein, after the second access path is enabled, the access path management module boots an operating system on the virtual machine, and the operating system uses the second access path via a driver of the virtual function.

* * * * *